United States Patent
Okbay et al.

(10) Patent No.: US 7,284,153 B2
(45) Date of Patent: Oct. 16, 2007

(54) APPARATUS, METHOD, AND SYSTEM FOR LOGGING DIAGNOSTIC INFORMATION

(75) Inventors: Bitwoded Okbay, Gilroy, CA (US); Carol Spanel, San Jose, CA (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 10/715,266

(22) Filed: Nov. 17, 2003

(65) Prior Publication Data

US 2005/0138471 A1   Jun. 23, 2005

(51) Int. Cl.
*G06F 11/00* (2006.01)
(52) U.S. Cl. ...................................... 714/30
(58) Field of Classification Search .................. 714/30
See application file for complete search history.

(56) References Cited

U.S. PATENT DOCUMENTS

| | | | | |
|---|---|---|---|---|
| 4,590,550 A | | 5/1986 | Eilert et al. ................. 364/200 |
| 5,185,862 A | | 2/1993 | Casper et al. ............... 395/250 |
| 5,560,006 A | * | 9/1996 | Layden et al. ................. 707/2 |
| 5,619,644 A | | 4/1997 | Crockett et al. ....... 395/183.21 |
| 5,630,102 A | | 5/1997 | Johnson et al. ............. 395/500 |
| 5,933,626 A | | 8/1999 | Mahalingaiah et al. ..... 395/568 |
| 5,944,841 A | * | 8/1999 | Christie ........................ 714/38 |
| 6,106,573 A | * | 8/2000 | Mahalingaiah et al. ..... 717/128 |
| 6,418,489 B1 | * | 7/2002 | Mason et al. ................. 710/22 |
| 6,857,083 B2 | * | 2/2005 | Floyd et al. .................. 714/30 |
| 7,047,443 B2 | * | 5/2006 | Kudo et al. ................... 714/30 |
| 2003/0056154 A1 | * | 3/2003 | Edwards et al. ............. 714/45 |
| 2004/0078690 A1 | * | 4/2004 | Kohashi ....................... 714/38 |
| 2004/0088682 A1 | * | 5/2004 | Thompson et al. ......... 717/124 |

* cited by examiner

*Primary Examiner*—Bryce P Bonzo
(74) *Attorney, Agent, or Firm*—Kunzler & McKenzie (57) ABSTRACT

A diagnostic tracing logger is presented for use in a multi-thread environment in which diagnostic trace log entries are captured and recorded. The trace logs are composed of sequences of memory addresses used to access instructions and operands, instruction op-codes and register specifiers, sequences of memory addresses, branch instructions or exceptions, the contents of registers or semiconductor memory locations, and the like. In one embodiment, a software module configures a plurality of buffers to capture bus traces, each trace triggered by a specific pattern. A buffer controller manages transfer of diagnostic trace information from the plurality of buffers to a diagnostic log without using processor memory cycles. The trace information is transferred to a selected buffer using a processor cache flush instruction. Diagnostic trace logging facilitates diagnosis of complex system and software interactions without the cost and overhead of prior art trace logging techniques.

28 Claims, 5 Drawing Sheets

APPARATUS, METHOD, AND SYSTEM FOR LOGGING DIAGNOSTIC INFORMATION

BACKGROUND OF THE INVENTION

1. Field of the Invention

The present invention relates to the logging of diagnostic information in data processing systems. Specifically, the invention relates to apparatus, methods, and systems for capturing and recording software generated diagnostic traces during execution of complex data processing tasks.

2. Related Art

Among the techniques used in the testing and diagnosis of complex high performance data systems are trace driven diagnostics. Trace driven diagnostics involve the use of diagnostic logs containing information such as significant events that occur in the course of executing programs of interest. The logged information may be used to determine how the system behaves under various conditions and situations.

A trace may contain various levels of information. An address trace, for example, often contains the sequence of memory addresses used to access instructions and operands. An instruction trace typically contains instruction op-codes and register specifiers in addition to the sequence of memory addresses. Other traces may contain only branch instructions or exceptions. Still other traces may contain the contents of registers or semiconductor memory locations. The information in a trace may thus take various forms that capture the sequence in which the events occur.

Several methods for collecting traces are commonly used to facilitate diagnosis and correction of system errors. One method is to use an instruction stepping or trapping feature provided by a processor to expedite software debugging. The instruction stepping feature typically enables the debugging software to gain control after each instruction executed by a program of interest. The debugging software is often set up to write information to a file on the execution of each instruction, thereby collecting a trace of program execution. The EFLAGS TF bit of the X86 architecture implements such a method.

A major disadvantage of instruction stepping methods is that many instructions within the debugging software must be executed for each instruction in the program being traced. In addition, system software typically cannot be traced in this fashion, due to conflicts in the use of system resources between the system software and the debugging software. Traces are typically limited to a specific program and may not reflect the overall behavior of a system in which several programs and multiple system code modules may be running.

A second method of collecting traces is to add instructions to a particular program that generate a trace of certain information as the program executes. By using this information, typically in conjunction with the binary image of the program, a detailed trace of execution may be constructed. The trace generating instructions are typically inserted by a compiler. However, in order to use this method, the user must have access to the source code. Furthermore, only a single program can be traced, which means that related system activity will not be traced.

A third common method of collecting traces is to collect the cycle-by-cycle pin state of a processor as it executes code using a device such as a logic analyzer. This method is often referred to as a 'bus trace.' Bus traces can be collected at normal processor speed at least until the capacity of the trace storage device has been reached. Advantages of this method are that it reflects real-time operation and is transparent to the system. Accordingly, the behavior of system code and all active programs can be captured.

Bus tracing has several disadvantages, however, the external hardware required to conduct such traces is often expensive. In addition, for a pipelined processor, the bus activity associated with instruction fetching is asynchronous to the data references that the instructions make, and it can be difficult to link an instruction with a memory reference. Moreover, instructions may be fetched but not actually executed due to the branches contained in the instruction stream. Finally, bus activity reflects physical memory addressing and may be of limited value in situations where virtual addresses are needed.

A fourth tracing method, less commonly used, but possible on microcoded microprocessors, is to modify the microcode of each instruction such that each executed instruction generates an information record that is captured in a memory, or the like, for subsequent analysis. This method typically has much less time overhead than debug software based tracing, and since it operates below the instruction level it is transparent to the system software, thereby enabling the system software to be traced as well. However, this technique can only be used with a writeable microcode memory making it unsuitable for commercial microprocessors which must use higher density read only microcode memory due to space constraints.

The aforementioned diagnostic tracing methods have disadvantages and limitations that reduce the usefulness of conducting tracing on software driven systems-particularly customer owned systems deployed in real world environments. Accordingly, there is a need for a mechanism that permits broader deployment of diagnostic tracing while not possessing the inherent disadvantages set forth above.

SUMMARY OF THE INVENTION

The present invention has been developed in response to the present state of the art, and in particular, in response to the problems and needs in the art that have not yet been fully solved by currently available diagnostic information loggers. Accordingly, the present invention has been developed to provide an apparatus, method, and system for logging diagnostic information that overcome many or all of the above-discussed shortcomings in the art.

In one aspect of the present invention, an apparatus for diagnostic trace logging includes one or more software modules that provide diagnostic information to a bus, multiple buffers configured to record bus information upon detection of specific bus patterns, and multiple buffer controllers configured to transfer information from a buffer to an associated diagnostic log. The one or more software modules may be configured to provide a variety of diagnostic information to the bus. For example, sequences of memory addresses used to access instructions and operands, instruction op-codes and register specifiers, sequences of memory addresses, branch instructions or exceptions, the contents of registers or semiconductor memory locations, and the like maybe recorded in specific diagnostic logs.

The present invention enables the acquisition of multiple independent diagnostic trace logs, each trace log containing sequential information optimized to provide insight into system response at the trace trigger location. Moreover, the nature of the trace information collected may be changed by the one or more software modules during program execution, to provide more detailed trace information or more trace logs to be captured during system activity of particular interest.

In some embodiments, the diagnostic trace logs are captured with minimal impact to system performance, thus enabling diagnostic trace logs to be captured during normal system operation and providing valuable diagnostic information to customer service personnel. In certain embodiments, the one or more software modules may be composed of elements located in multiple threads, thus providing insight into thread interactions. The diagnostic trace log may have a date/time stamp associated with log entries, thus enabling correlation of trace sequences of independent threads or system response to unrelated events and may enable recreation of a sequence of possibly unrelated events leading to system failure.

The present invention facilitates diagnosis of system anomalies and recovery from system faults by providing multiple independent diagnostic trace logs that are optimized to provide valuable information regarding system response to events of interest. The diagnostic trace log capability may be used not only during system design and test, but also during normal operation because of the extremely low impact on system performance.

These and other features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in FIGS. 1 through 5, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
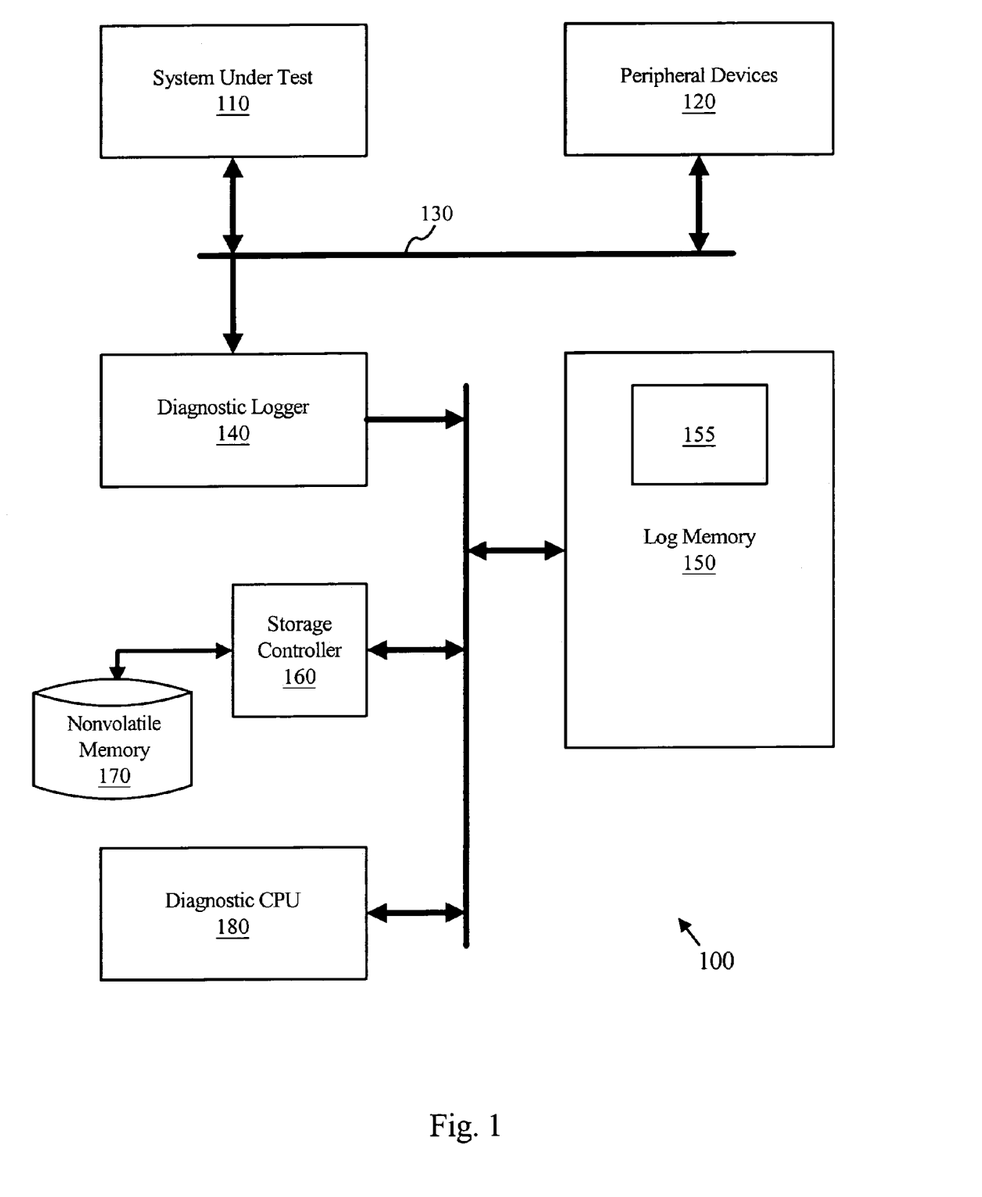
FIG. 1 is a block diagram illustrating one embodiment of a diagnostic trace logging system of the present invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment and the described features, structures, or characteristics maybe combined in any suitable manner in one or more embodiments FIG. 1 is a block diagram illustrating one embodiment of a diagnostic trace logging system 100 of the present invention. The depicted embodiment includes a system under test 110, a set of peripheral devices 120, an information bus 130, a diagnostic logger 140, a log memory 150, a storage controller 160, a nonvolatile memory 170, and a diagnostic CPU 180. The diagnostic trace logging system provides improved diagnostic tracing over currently available solutions.

As exemplified in FIG. 1, the system under test 110 may be a high performance data processing system executing multiple simultaneous processes. The set of peripheral devices 120 in certain embodiments are a plurality of subsystems and devices that provide information storage, user access, network connections, and the like. The information bus 130 transfers information between system components such as memory elements, peripheral devices, and so forth. The primary purpose of the diagnostic logging system 100 is to generate and record multiple diagnostic trace logs, that are composed of a sequence of traces captured from the system under test 110.

The diagnostic logger 140 is attached to the information bus 130, and in one embodiment captures bus traces as directed by the diagnostic CPU 180. The diagnostic logger 140 directs the bus traces into temporary storage locations and may subsequently write the temporary storage locations into the log memory 150, forming a diagnostic trace log 155.

The diagnostic CPU 180 in one embodiment initializes the diagnostic logger 140 and may cause the diagnostic trace logs to be transferred to the storage controller 160 and subsequently written to nonvolatile memory 170. In some embodiments, the function of the diagnostic CPU 180 is performed by a process thread executing within the system under test 110, while the function of the log memory 150 is performed by a portion of a system memory within the system under test 110. The function of the storage controller 160 and nonvolatile memory 170 may in certain embodiments be performed by members of the set of peripheral devices 120.

Figure 2:
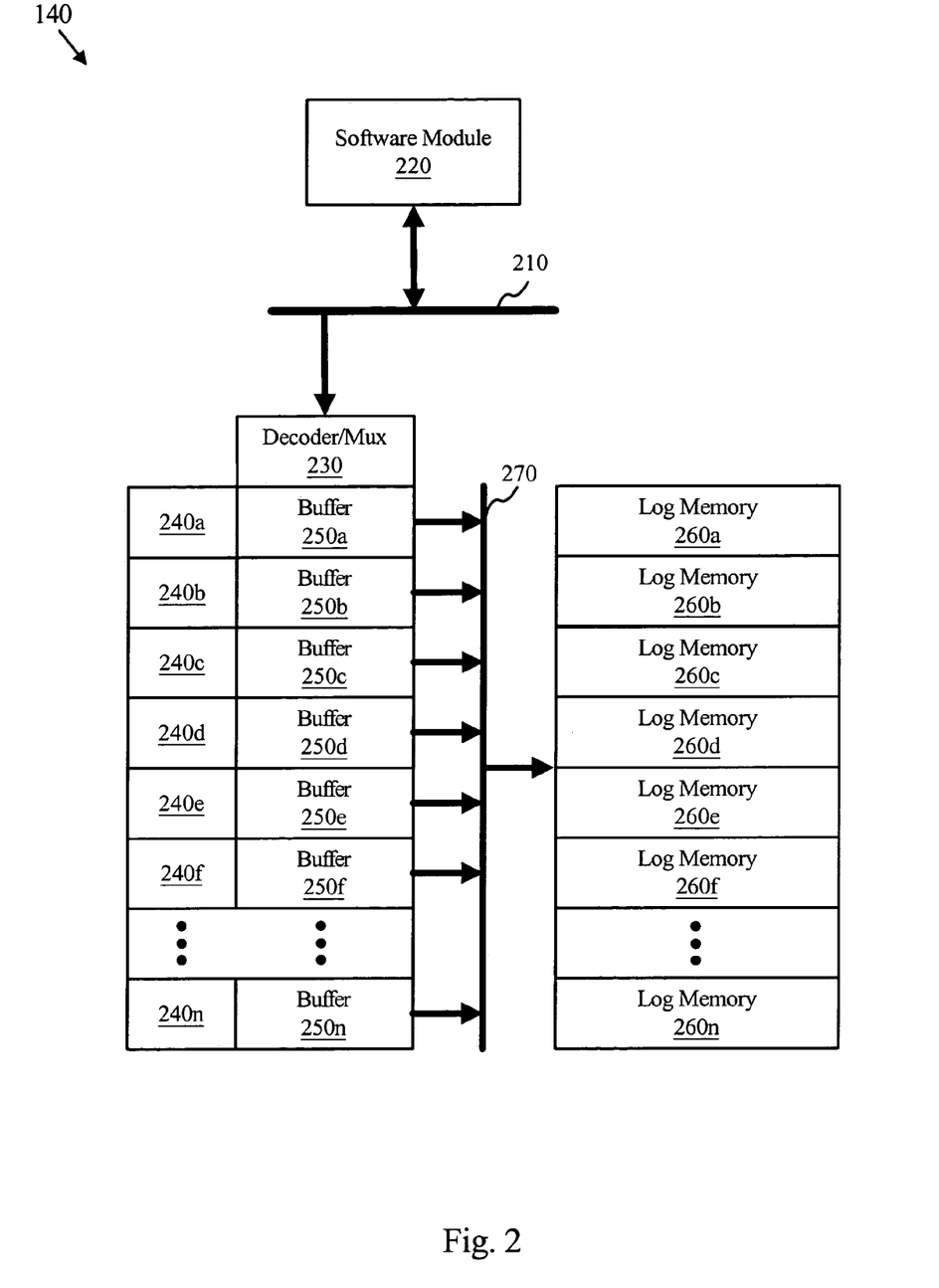
FIG. 2 is a block diagram illustrating one embodiment of a diagnostic information logging apparatus of the present invention.

FIG. 2 is a block diagram illustrating a diagnostic logger 200 of the present invention corresponding to the diagnostic logger 140 of FIG. 1. The depicted embodiment includes an information bus 210, at least one software module 220, a decoder/multiplexer 230, a plurality of buffer controllers 240, a plurality of buffers 250, a plurality of log memories 260 contained within the log memory 150 of FIG. 1, and a memory bus 270. The plurality of buffer controllers, buffers, and log memories enable the diagnostic logger 200 to record multiple independent streams of diagnostic trace information.

The information bus 210 is in one embodiment the system bus of a system under test 130 of FIG. 1, but may be an input/output bus or other information bus associated with the system under test 130. The software module 220 is in one embodiment configured to output diagnostic information to the information bus 210. The diagnostic information may be a sequence of memory addresses used to access instructions and operands, instruction op-codes and register specifiers, a sequence of memory addresses, branch instructions or exceptions, the contents of registers or semiconductor memory locations, or the like.

In some embodiments, the software module 220 is formed of program elements in multiple threads, each element presenting diagnostic information to the information bus 210 according to the sequence of trace events pertaining to that thread. In some embodiments the software module 220 outputs traces to the information bus 210 by flushing a cache line. The software module 220 may configure traces to be fixed length or variable length. In some embodiments the software module 220 appends a date/time stamp to the traces. In certain embodiments, the software module 220 initializes pattern match registers used by the decoder/multiplexer 230 and configures diagnostic log memory 260 start address and extents.

The decoder/multiplexer 230 monitors the information bus 210 by matching the bus state with pre-initialized pattern registers. In certain embodiments, upon finding a pattern match, the decoder/multiplexer 230 transfers information from the information bus 210 to a particular buffer 250, based on the particular pattern identified. In some embodiments, multiple buffers 250 are available for trace storage, each buffer 250 being associated with a specific pattern loaded into a pattern register internal to the decoder/multiplexer 230 by the software module 220. In certain embodiments, the decoder/multiplexer 230 interrogates pattern matched information asserted on the information bus 210 to determine the number of bytes-to be stored in the buffer 250.

In the depicted embodiment, the buffer controller 240 maintains a pointer (not shown) to a next available memory location for writing to the corresponding buffer 250 and a pointer to a next available memory location (not shown) for reading from the corresponding buffer 250. The buffer controller determines if the buffer 250 threshold is reached and if the threshold is reached, arbitrates for the memory bus 270. The buffer controller 240 subsequently transfers the contents of the buffer memory device 250 to the corresponding log memory 260. In some embodiments, the buffer memory controller 240 may determine if a log memory threshold is reached and transfers the contents of the log memory 260 to a nonvolatile storage controller (not shown). In certain embodiments, the buffer controller 240 maintains a recent history log by enabling the most recent contents of the buffer 250 to overwrite the oldest diagnostic trace log in the associated log memory 260.

Figure 3:
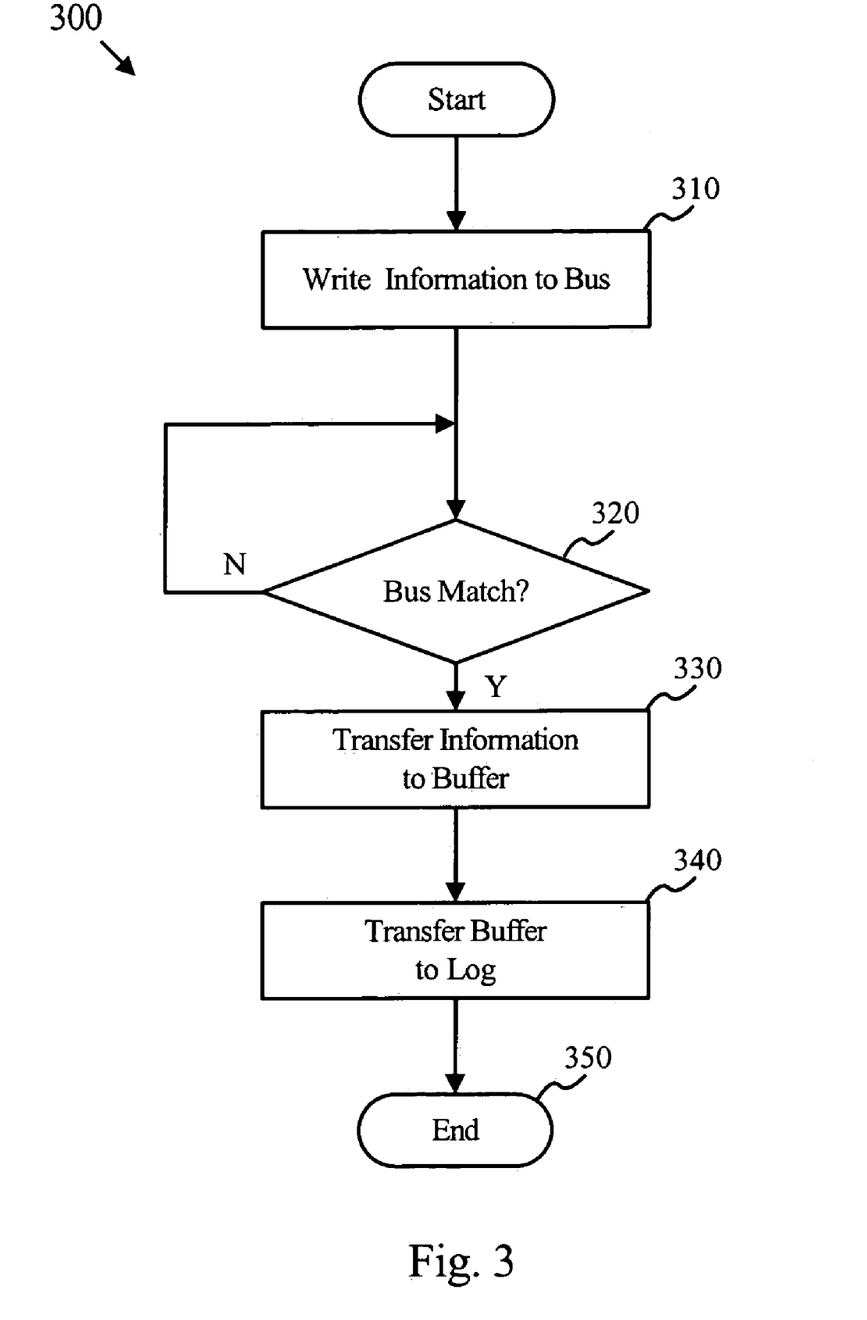
FIG. 3 is a flow chart diagram illustrating one embodiment of a diagnostic information logging method of the present invention.

FIG. 3 is a flow chart diagram illustrating one embodiment of a diagnostic information logging method of the present invention. The depicted embodiment of the diagnostic information logging method 300 includes an write information to bus step 310, a bus match decision 320, a transfer information to buffer step 330, a transfer buffer to log step 340, and an end step 350. The diagnostic information logging method enables capture of multiple independent diagnostic trace logs that can be optimized to provide valuable information regarding system response to events of interest.

In one embodiment, the write information to bus step 310 outputs diagnostic information to an information bus, such as the information bus 210 of FIG. 2. The information to bus step may be conducted using the software module 220 of FIG. 2, or may be conducted independent thereof. The diagnostic information may be a sequence of memory addresses used to access instructions and operands, instruction op-codes and register specifiers, a sequence of memory addresses, branch instructions or exceptions, the contents of registers or semiconductor memory locations, or the like.

The diagnostic information logging method 300 performs the bus match test 320 by examining the bus to determine if the bus state matches a trace trigger pattern. The examination may be conducted using the decoder/mux 230 of FIG. 2, or the like. If the bus state does not match any trace trigger pattern, the diagnostic information logging method 300 continues to execute the bus match test 320. If the bus state matches a trace trigger pattern, the transfer information to buffer step 330 stores information into a buffer associated with the trace trigger pattern. The transfer information to buffer step 330 may be conducted using a buffer controller such as the buffer controller 240 of FIG. 2. The transfer buffer to log step 340 writes data temporarily stored in a buffer into an associated address space in log memory, an example of which is the log memory 260 of FIG. 2. The transfer may be conducted using the buffer controller 240 of FIG. 2, or the like. After the transfer is complete, control passes to the end step 350.

Figure 4:
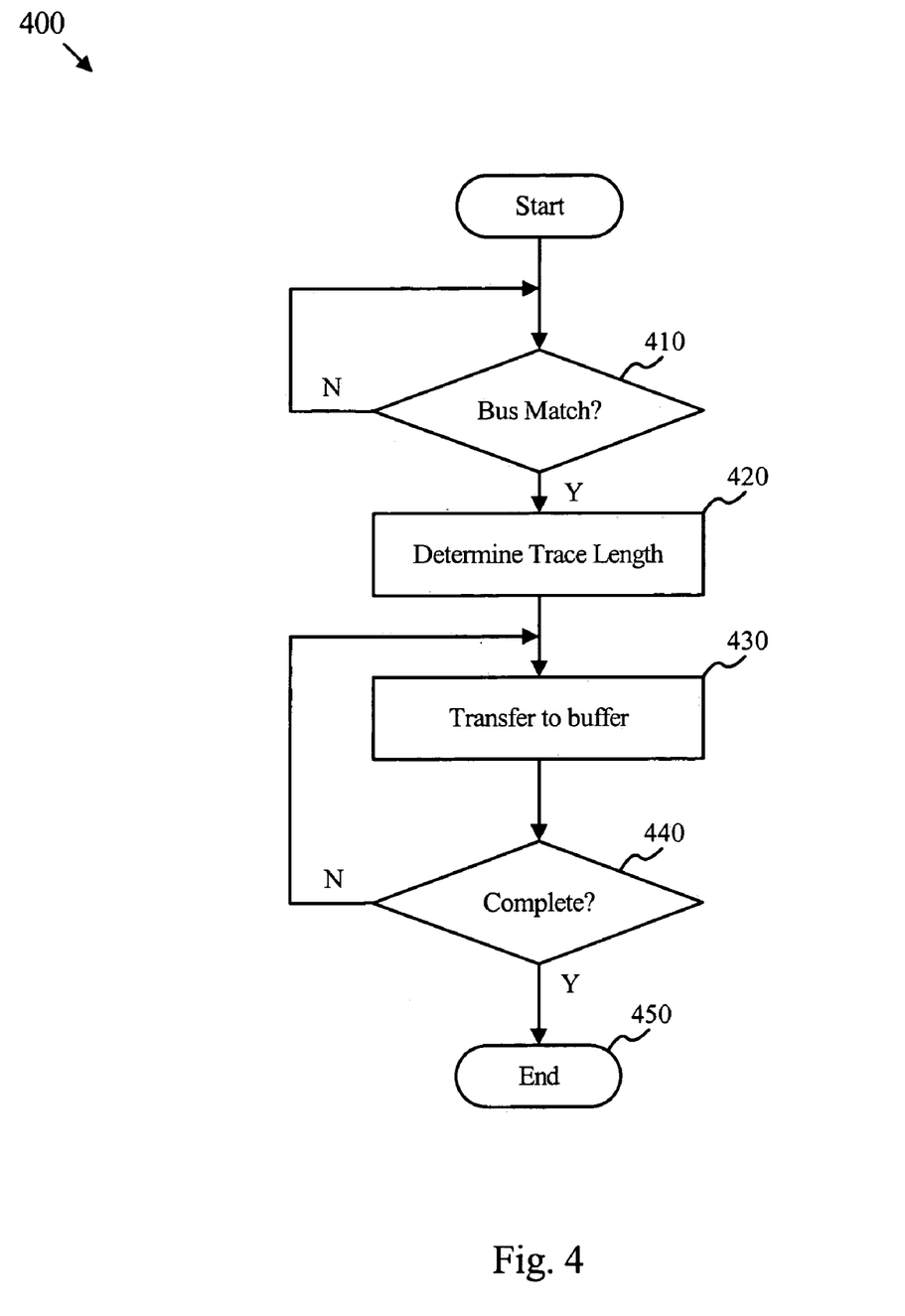
FIG. 4 is a flow chart diagram illustrating one embodiment of an input decoding method of the present invention.

FIG. 4 is a flow chart diagram illustrating one embodiment of an input decoding method of the present invention. The depicted embodiment of the input decoding method 400 includes a bus match test 410, a determine trace length step 420, a transfer to buffer step 400, a transfer complete test 440, and an end step 450. Prior to start of the input decoding method 400, an initialization process is performed wherein a multiplicity of trace trigger patterns are submitted, each trace trigger pattern being associated with a specific buffer such as a buffer 250 of FIG. 2.

In one embodiment, the bus match test 410 examines a state change of an information bus data to determine if the bus state matches one of the multiplicity of trace trigger patterns. The examination may be conducted using the decoder/mux 230 of FIG. 2, or may be conducted independent thereof. If the bus state does not match any of the trace trigger patterns, the bus match test 410 is performed again. If the bus state matches any of the trace trigger patterns, the determine trace length step 420 examines the information bus state bits wherein a trace length description is encoded. The examination may be conducted using the decoder/mux 230 of FIG. 2, or the like.

The transfer to buffer step 430 transfers a quantum of information from the information bus to the buffer associated with the specific trace trigger pattern identified in the bus match test 410. The transfer may be conducted using the buffer controller 240 of FIG. 2, or may be conducted independent thereof. Control then passes to the transfer complete test 440 which determines if the complete trace as identified in the determine trace length step 420 has been transferred. If the transfer is incomplete, the transfer to buffer step 430 is performed again. If the transfer is complete, control passes to the end step 450

Figure 5:
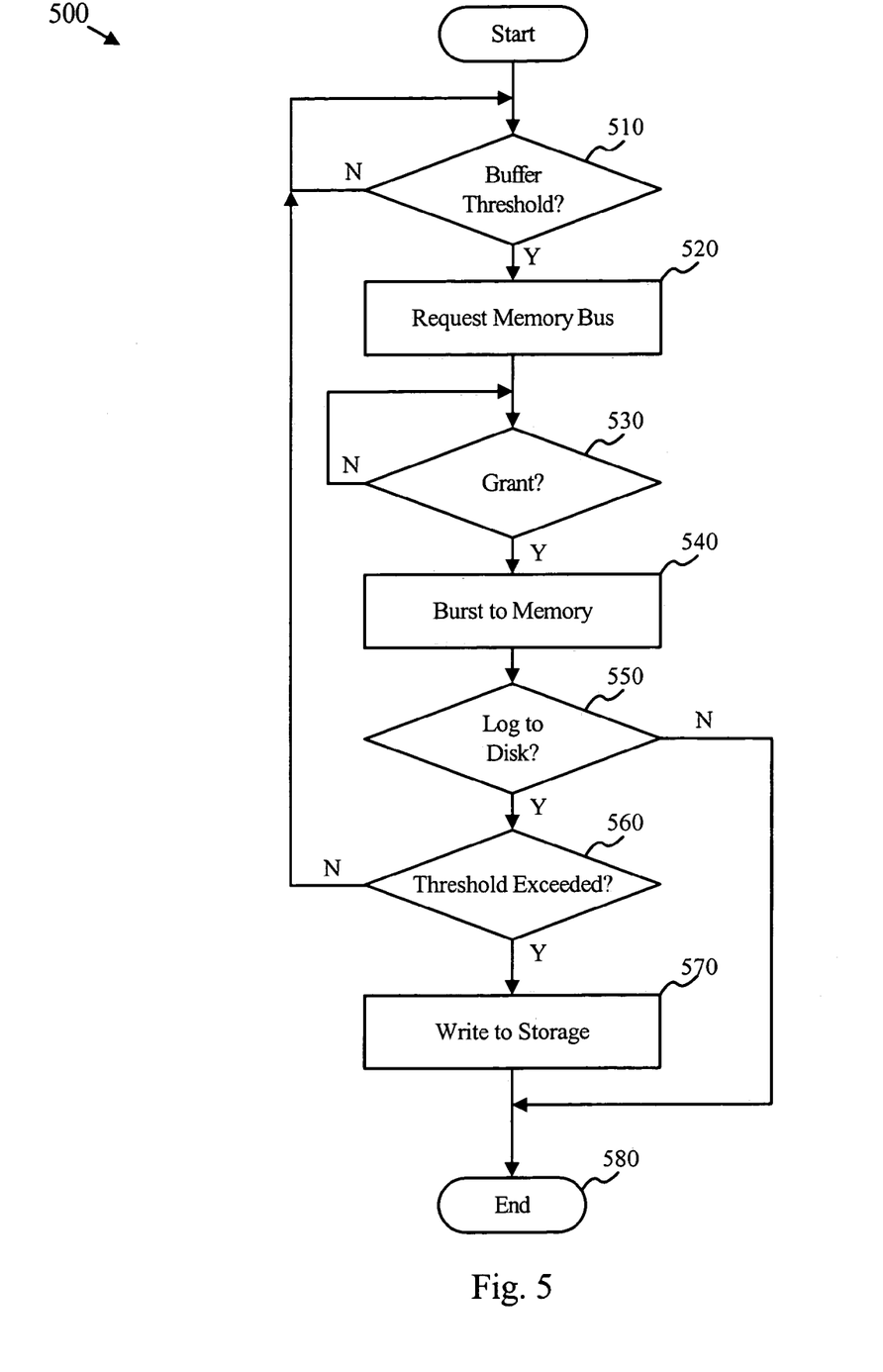
FIG. 5 is a flow chart diagram illustrating one embodiment of a trace logging method of the present invention.

FIG. 5 is a flow chart diagram illustrating one embodiment of a trace logging method of the present invention. The depicted embodiment of the trace logging method 500 includes a buffer threshold test 510, a request memory bus step 520, a bus grant test 530, a burst to memory step 540, a log to disk test 550, a threshold exceeded test 560, a write to storage step 570, and an end step 580. Prior to start of the trace logging method 500, an initialization process may be performed wherein a multiplicity of diagnostic log starting addresses and diagnostic log extents are submitted, each diagnostic log starting address and extent being associated with a specific buffer such as a buffer 250 of FIG. 2.

In one embodiment, the buffer threshold test 510 determines the amount of free space remaining in each buffer. The determination may be made by a buffer controller such as the buffer controller 240 of FIG. 2, or may be conducted independent thereof. If none of the buffer memories have reached a predefined threshold, the buffer threshold test 510 is performed again. If one or more of the buffer memories have reached a predefined threshold, then the request memory bus step 520 arbitrates for the log memory bus. A buffer controller such as the buffer controller 240 of FIG. 2 may conduct the arbitration. Control then transfers to the bus grant test 530, which determines if access to the log memory bus has been granted.

If bus access has not been granted, the request memory bus step 520 is repeated. If bus access has been granted, the burst to memory step 540 flushes each of the buffer memories identified as reaching a threshold in the buffer threshold test 510 to the associated diagnostic log memory space associated with that specific buffer. The burst memory step may be conducted by the buffer controller 240 of FIG. 2, or may be conducted independent thereof. Control is then passed to the log to disk test 550 which determines if the diagnostic log is to be retained in memory or written to nonvolatile storage. If the log is to be retained in memory, control transfers to the end step 580.

If the log is to be retained in nonvolatile storage, the log generator method 500 performs the threshold exceeded test 560 by determining the amount of free space remaining in each diagnostic log. If none of the diagnostic logs has reached a predefined threshold, control is transferred to the buffer threshold test 510. If one or more of the diagnostic logs has reached a predefined threshold, the write to storage 570 step transfers each of the diagnostic logs identified as reaching a threshold in the threshold exceeded test 560 to an associated diagnostic log memory space in nonvolatile memory such as the nonvolatile memory 170 of FIG. 1, and subsequently transfers control to the end step 580.

The present invention facilitates the capture and recording of diagnostic trace logs in a high performance, multi-threaded environment. Separate diagnostic logs may be maintained to show a sequence of associated diagnostic traces captured from a multiplicity of threads, processes, and processors. In some embodiments, the separate diagnostic logs may include time/date stamps in order to enable examination of system response to simultaneous but non-related events. Each trace may be optimized to show the most critical diagnostic information. In certain embodiments the diagnostic logging occurs with very little performance penalty, enabling diagnostic trace logs to be generated during normal system operation. The diagnostic trace logs may subsequently be used by customer service to diagnose system or software failures.

The present invention may be embodied in other specific forms without departing from its spirit or essential characteristics. The described embodiments are to be considered in all respects only as illustrative and not restrictive. The scope of the invention is, therefore; indicated by the appended claims rather than by the foregoing description. All changes which come within the meaning and range of equivalency of the claims are to be embraced within their scope.

What is claimed is:

1. An apparatus for logging diagnostic information, the apparatus comprising:
   at least one software module configured to provide diagnostic information to a bus;
   a plurality of buffers configured to store data;
   a buffer management module configured to transfer diagnostic information from the bus to a selected buffer of the plurality of buffers;
   the buffer management module further configured to transfer the diagnostic information from the selected buffer to a diagnostic log corresponding to the selected buffer; and
   the buffer management module further configured to transfer the diagnostic information from the bus to a selected buffer memory device in response to a processor cache line flush.

2. The apparatus of claim 1, wherein the plurality of buffers are configured as a plurality of First In First Out (FIF0) memory devices.

3. The apparatus of claim 1, wherein the plurality of buffers are configured as a plurality of circulating buffer memory devices.

4. The apparatus of claim 1, wherein the buffer management module is further configured to transfer variable-length diagnostic information from the bus to the selected buffer.

5. The apparatus of claim 1, wherein the buffer management module is further configured to transfer the diagnostic information from a selected buffer to the diagnostic log without consuming processor cycles.

6. The apparatus of claim 1, wherein the diagnostic log resides within a processor-accessible memory.

7. The apparatus of claim 1, wherein the diagnostic log resides within a multiple-use memory.

8. The apparatus of claim 1, further comprising a decoder module configured to match a bus state with at least one tracing pattern register.

9. The apparatus of claim 1, wherein the bus is a processor data bus.

10. The apparatus of claim 1, further comprising a control register configured to store a starting address of a selected buffer.

11. The apparatus of claim 1, further comprising a control register configured to store an extent of a selected buffer.

12. The apparatus of claim 1, further comprising a control register configured to store a starting address of a diagnostic log associated with a selected buffer.

13. The apparatus of claim 1, further comprising a control register configured to store an extent of a diagnostic log associated with a selected buffer.

14. A computer readable storage medium comprising computer readable program code for logging diagnostic information, the program code configured to conduct a method comprising:
   providing diagnostic information to a bus;
   administering a buffer management module, including:
      transferring diagnostic information from the bus to a selected buffer of a plurality of buffers configured to store data in response to a processor cache line flush; and
      transferring diagnostic information from a selected buffer to a diagnostic log corresponding to the selected buffer.

15. The computer readable storage medium of claim 14, wherein the selected buffer is configured as a First In First Out memory device.

16. The computer readable storage medium of claim 14, wherein the diagnostic information is variable-length.

17. The computer readable storage medium of claim 14, wherein the buffer is configured as circulating buffer memory device.

18. The computer readable storage medium of claim 14, wherein transferring diagnostic information from a selected buffer to a diagnostic log comprises transferring the diagnostic information from the selected buffer to the diagnostic log without consuming processor cycles.

19. An apparatus for logging diagnostic information, the apparatus comprising:
   means for providing diagnostic information to a bus;
   means for transferring the diagnostic information from the bus to a selected buffer of a plurality of buffers
   means for transferring the diagnostic information from the selected buffer to a diagnostic log corresponding to the selected buffer;
   means for transferred diagnostic information from the bus in response to a processor cache line flush.

20. The apparatus of claim 19, further comprising means for transferring diagnostic information from the selected buffer to the diagnostic log without consuming processor cycles.

21. A system for logging diagnostic information, the system comprising:
   at least one module configured to provide diagnostic information to a bus;
   a plurality of buffers configured to store data;
   a buffer management module configured to transfer diagnostic information from the bus to a selected buffer of the plurality of buffers;
   the buffer management module further configured to transfer the diagnostic information from the selected buffer to a diagnostic log corresponding to the selected buffer; and
   the buffer management module further configured to transfer the diagnostic information from the bus to a selected buffer memory device in response to a processor cache line flush.

22. The system of claim 21, wherein the plurality of buffers are configured as a plurality of First In First Out (FIFO) memory devices.

23. The system of claim 21, wherein the plurality of buffers are configured as a plurality of circulating buffer memory devices.

24. The system of claim 21, wherein the buffer management module is further configured to transfer variable-length diagnostic information from the bus to the selected buffer.

25. The system of claim 21, wherein the buffer management module is further configured to transfer the diagnostic information from a selected buffer to the diagnostic log without consuming processor cycles.

26. A method for logging diagnostic information, the method comprising:
   providing diagnostic information to a bus;
   transferring the diagnostic information from the bus to a selected buffer of a plurality of buffers in response to a processor cache line flush; and
   transferring the diagnostic information from the selected buffer to a diagnostic log corresponding to the selected buffer.

27. A FIFO management module, comprising:
   a first transfer module configured to initiate a transfer of diagnostic information from a bus to a selected FIFO memory device in response to a processor cache line flush; and
   a second transfer module configured to initiate a transfer of the diagnostic information from the selected FIFO memory device to a diagnostic log corresponding to the selected FIFO memory device.

28. The FIFO management of claim 27, wherein the FIFO memory device is configured to transfer the diagnostic information from the selected memory device to the diagnostic log without consuming processor cycles.

* * * * *